(12) United States Patent
Sarkar et al.

(10) Patent No.: US 7,383,704 B2
(45) Date of Patent: Jun. 10, 2008

(54) APPARATUS FOR DEPOSITION BY FLAME HYDROLYSIS

(75) Inventors: Arnab Sarkar, West Hills, CA (US); Bedros Orchanian, North Hills, CA (US)

(73) Assignee: Nextrom Oy (CH)

( * ) Notice: Subject to any disclaimer, the term of this patent is extended or adjusted under 35 U.S.C. 154(b) by 285 days.

(21) Appl. No.: 11/050,461

(22) Filed: Feb. 1, 2005

(65) Prior Publication Data

US 2005/0166641 A1 Aug. 4, 2005

Related U.S. Application Data

(60) Provisional application No. 60/541,327, filed on Feb. 2, 2004.

(51) Int. Cl.
 *C03B 37/018* (2006.01)
 *C03B 5/237* (2006.01)
 *F27B 1/26* (2006.01)

(52) U.S. Cl. .............................. 65/531; 65/483; 65/532

(58) Field of Classification Search .................. 65/21.5
 See application file for complete search history.

(56) References Cited

U.S. PATENT DOCUMENTS 2,272,342 A 2/1942 Hyde

| | | | |
|---|---|---|---|
| 4,726,827 A | * | 2/1988 | Powers .......................... 65/415 |
| 2003/0024273 A1 | * | 2/2003 | Ishihara ....................... 65/382 |

OTHER PUBLICATIONS

Morrow, Alan J., et al., "Outside Vapor Deposition," *Optical Fiber Communications*, 1985, vol. 1, pp. 65-95.

* cited by examiner

*Primary Examiner*—Philip C Tucker
*Assistant Examiner*—Phu H Nguyen
(74) *Attorney, Agent, or Firm*—Sheppard, Mullin, Richter & Hampton LLP

(57) ABSTRACT

An outside chemical vapor deposition apparatus is disclosed for depositing porous glass-forming material onto a target rod to form a cylindrical body, with substantially higher efficiency than could prior apparatus. The apparatus includes two separate burner arrays, one array optimized for depositing the material during an initial stage of the process, when the cylindrical body has a relatively small diameter, and the other array optimized for depositing the material during a later stage of the process, when the cylindrical body has a relatively large diameter. In addition, each burner array can include a plurality of burners, with each burner azimuthally angled relative to the apparatus' air-flow axis, and with adjacent burners angled in opposite directions relative to that axis, to minimize the density gradient within the deposited porous material.

20 Claims, 4 Drawing Sheets

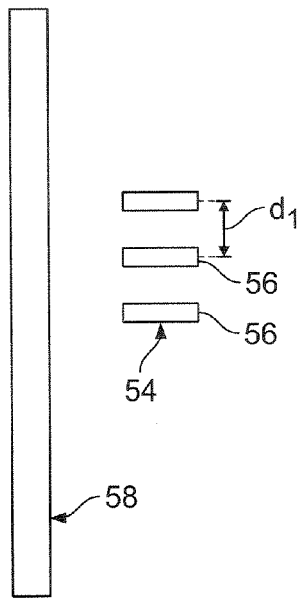
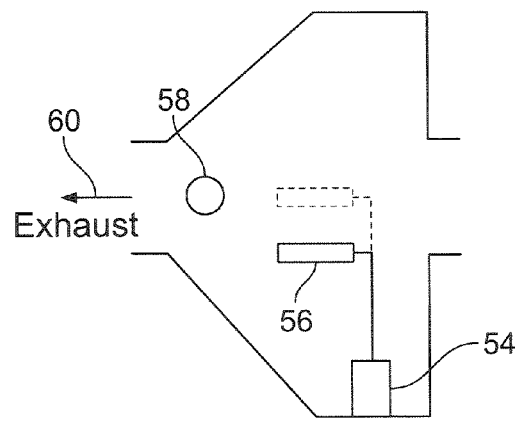
FIG. 3A
(Prior Art)
FIG. 3B
(Prior Art)
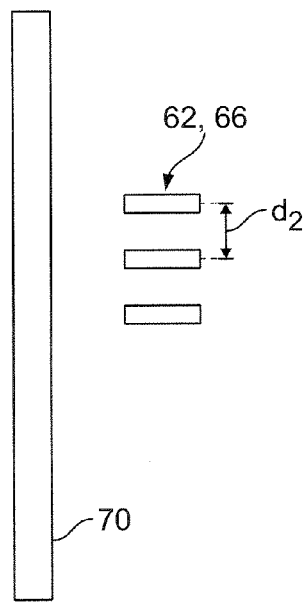
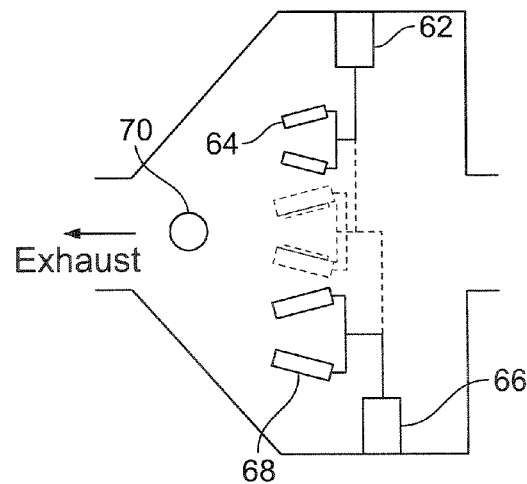
FIG. 4A
FIG. 4B

APPARATUS FOR DEPOSITION BY FLAME HYDROLYSIS

CROSS-REFERENCE TO RELATED APPLICATION

Priority is claimed from provisional patent application No. 60/541,327, filed Feb. 2, 2004.

BACKGROUND OF THE INVENTION

1. Field of Invention

This invention relates generally to chemical vapor deposition and, more particularly, to a particular kind of chemical vapor deposition called flame hydrolysis.

2. Description of Prior Art

In flame hydrolysis-type chemical vapor deposition, vapors of a glass-forming oxide material are directed to flow through a high-temperature, hydrogen-containing flame, whereupon the vapor reacts with water produced in the flame, to form oxide particles called soot. A portion of this soot is collected, to form a useful body of porous glass-forming material. The process is commercially used to produce optical fiber preforms and other high-purity, high-silica glass products. Often, the soot deposition occurs on a rotating substrate rod or tube, to form a cylindrical object. This process is called the outside vapor deposition or, in abbreviated form, the OVD process.

The flame hydrolysis process is described in U.S. Pat. No. 2,272,342, which issued in the 1940s, and the OVD process has been described in detail in chapter 2 of a book entitled "Optical Communications, Volume 1, Fiber Fabrication," edited by Tingye Li (1985). While depositing clad glass on a core rod for manufacturing clad glass for optical fiber preforms by the OVD process, the target core rod typically has a diameter between 20 and 50 mm. Uniform-diameter silica soot is deposited onto the rod, layer by layer, by traversing or oscillating an array of burners along the rod's entire useful length, until a diameter in the range of 150 to 400 mm has been achieved. Past equipment for performing this process has always used the same burner array throughout the deposition process, for the entire range of diameters. The burners of each such burner array have been optimized for maximum deposition rate and efficiency over the entire diameter range.

A specific burner configuration can achieve a maximum deposition rate only over a limited diameter range. To increase deposition rate beyond this maximum rate, multiple burners in an axially separated burner array have been used. Many configurations for such burner arrays have been used. In a burner traverse deposition apparatus, an array of burners traverse along the entire length of a rotating, but axially stationary target rod. In a preform-traverse deposition apparatus, on the other hand, the burners are held stationary and the rotating target rod traverses along the entire length of the burner array. Further, in an oscillating burner deposition chamber, an array of burners traverses a distance greater than the separation of adjacent burners of the array, but shorter than the length of the rotating target rod.

FIG. 1 shows one example of a prior art preform traverse apparatus 10, incorporating two burners 12 arranged in a vertically oriented array. A rotatable chuck 14 is mounted on a traverse mechanism, so that the chuck and a support rod 16 are moved up and down while rotating. The support rod projects downward into a deposition chamber 18, and it supports a hanging mechanism 20 from which is hung a target rod 22. A handle rod 24 is located at the target rod's lower end. Two flame hydrolysis burners 12, forming a two-burner array with the burners vertically separated, are mounted on an array mount 26, which in this case is shown as stationary in the vertical direction. The deposition process begins by moving the burners 12 horizontally off-axis and supplying chemicals to the burners for ignition. After the flame has stabilized, the burners are moved horizontally into a deposition position, in which the flames point directly at the target rod's axis of rotation 28. FIG. 1 also shows a coaxial alignment between the burners, an air intake, and an exhaust airflow. As the target rod traverses upward and downward in front of the burner array, the glass-forming particles, called soot, formed in the burner flames, deposit onto the target rod, forming layers of porous soot body or preform 30. After the weight of the porous glass has reached its target value, the cylindrical soot preform is raised above the deposition zone, the burners are turned off, and the preform is removed from the hanging mechanism 20 in the deposition chamber 18.

One limitation of the prior art machines described above is that burners of a single design are used throughout the deposition process. However, a flame hydrolysis burner design that is optimized for deposition onto small-diameter target rods is not necessarily efficient in depositing onto large-diameter target rods; conversely, a burner design optimized for deposition onto large-diameter target rods is not necessarily efficient in depositing onto small-diameter target rods. The prior art approach of using one burner design for the entire diameter range of deposition is becoming competitively limiting, as the need for ever-larger diameter preforms continues to increase.

Another limitation of the prior art machines described above is that burner spacing is fixed for the entire diameter range of deposition. However, as the target rod diameter increases during deposition, the soot stream and the flame spread axially over a longer length as they flow across the target rod. This requires a larger axial separation of burners to prevent adjacent burners from interacting with each other and negatively affecting the deposition rate and efficiency.

A vertical preform orientation is more convenient for deposition of large soot bodies, because it eliminates bending of the deposited object under the force of gravity, as can occur in a horizontal preform orientation. Nevertheless, one limitation of a deposition chamber having a vertical preform orientation and a coaxial burner and exhaust configuration is that a dead zone of zero velocity can be formed on the target rod's surface, 180° from the burner, where opposing soot streams flowing across the target rod collide with each other. Soot trapped in this dead zone because of buoyancy can float upward and deposit outside the hot zone and onto different parts of the deposition chamber's inner surface. Deposition outside the hot zone should be avoided, because the deposited material has a relatively low density and can cause the preform to crack. In addition, down time of the machine between runs is increased if soot has deposited onto the deposition chamber's inner surface, as that surface needs to be cleaned before starting the next deposition cycle.

It should, therefore, be appreciated that there remains a need for an outside chemical vapor deposition apparatus that deposits porous glass-forming material onto a target rod to form a cylindrical body, with greater efficiency than could be achieved in the past. The present invention fulfills this need and provides further related advantages.

SUMMARY OF THE INVENTION

The present invention resides in an improved outside chemical vapor deposition apparatus for depositing porous glass-forming material onto a target rod to form a cylindrical body, with greater efficiency than could be achieved in the past. The apparatus includes first and second burner arrays, with the first array being configured for optimum deposition onto a cylindrical body having a first diameter and the second array being configured for optimum deposition onto a cylindrical body having a second diameter, larger than the first diameter. The two burner arrays are configured to be used separately to deposit porous glass-forming material onto the target rod at successive times. This enables apparatus to deposit porous glass-forming oxide materials using a flame hydrolysis process without stopping the apparatus, to cover the entire diameter range of the cylindrical object to be fabricated.

In other, more detailed features of the invention, the first burner array includes a first plurality of spaced-apart burners, and the second burner array includes a second plurality of spaced-apart burners, the second plurality being less than the first plurality. The burners of the first burner array are spaced apart from each other by less than are the burners of the second burner array. The first and second burner arrays have substantially the same lengths along the target rod's longitudinal axis and are arranged in a parallel relationship.

In one embodiment of the invention, the apparatus further includes a support for supporting and rotating the target rod and cylindrical body about the rod's longitudinal axis and for traversing the target rod and cylindrical body past the burners of first and second burner arrays. In an alternative embodiment of the invention, the first and second burner arrays are configured to traverse past the target rod and cylindrical body while the support rotates the target rod and cylindrical body. In both cases, the support preferably supports the target rod and cylindrical body with the rod's longitudinal axis in a substantially vertical orientation.

In yet other more detailed features of the invention, the burners of the first and second burner arrays are mounted such that they can be selectively directed horizontally off-axis from the target rod's longitudinal axis, so as not to deposit material beyond a pre-selected length of the target rod. In addition, the first and second burner arrays can be configured to oscillate axially by an amount substantially the same as the spacing between each array's plurality of burners. Further, the first and second burner arrays both can be configured to be selectively movable toward and away from the target rod's longitudinal axis. Further, the burners of the first and second burner arrays are inclined upwards relative to a horizontal axis.

In a separate and independent feature of the invention, the apparatus further includes an exhaust system defining an air-flow axis, and the burners are azimuthally angled relative to such air-flow axis, with adjacent burners being angled in opposite directions relative to the air-flow axis. This minimizes the density gradient within the deposited porous material. This feature of the invention has utility even if the apparatus includes just a single burner array.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIGS. 3a and 3b are simplified elevational and top plan views, respectively, of a deposition assembly in accordance with the prior art, the assembly including just a single burner array having a plurality of burners aligned in a vertical direction.

FIGS. 4a and 4b are simplified elevational and top plan views, respectively, similar to FIGS. 3a and 3b, but of a deposition assembly in accordance with a second preferred embodiment of the invention, this assembly including two burner arrays, one optimized for deposition at an early stage of the process, when the cylindrical body has a relatively small diameter, and the other optimized for deposition at a later stage of the process, when the cylindrical body has a relatively large diameter.

DESCRIPTION OF THE PREFERRED EMBODIMENTS

Figure 1:
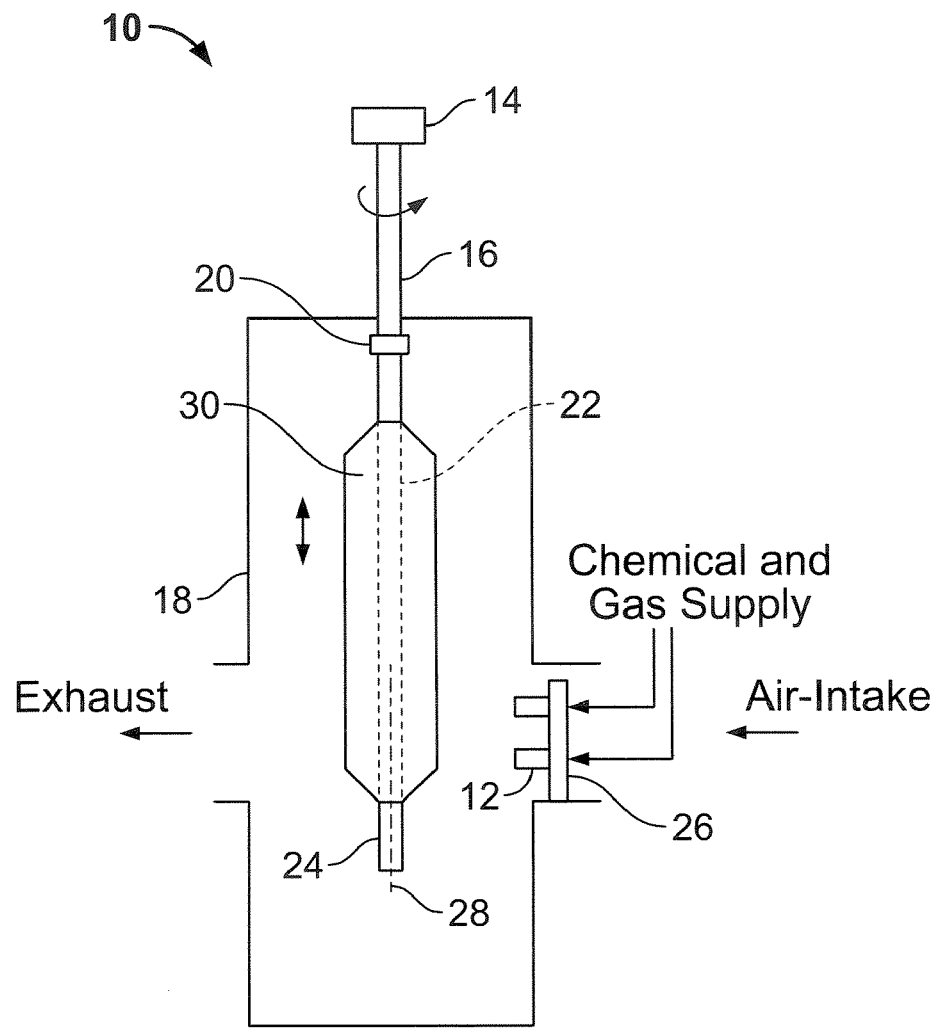
FIG. 1 is a simplified schematic elevational view of a deposition assembly that is part of an outside vapor deposition apparatus in accordance with the prior art, the deposition assembly including just a single burner array.
Figure 2:
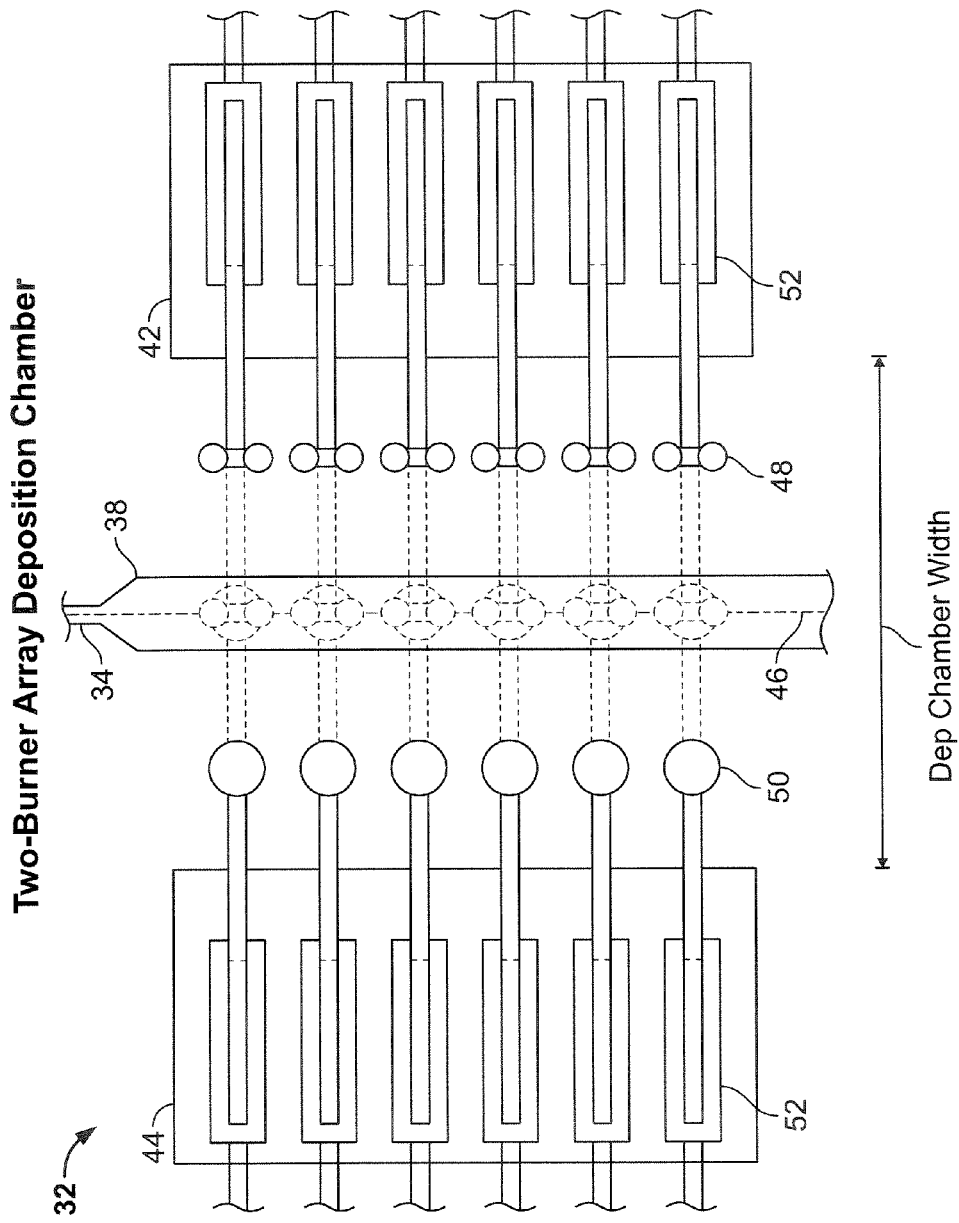
FIG. 2 is a simplified schematic elevation view of the burner arrays of a deposition assembly of an outside vapor deposition apparatus in accordance with a first preferred embodiment of the invention.

With reference now to the drawings, and particularly to FIG. 2, there is shown a deposition assembly 32 that is part of a first preferred embodiment of an outside vapor deposition apparatus. The apparatus includes three units: the deposition assembly 32, a vapor delivery system (not shown), and a control system (not shown). The deposition assembly includes a plurality of burners, a support for rotating and axially translating a target rod 34 and cylindrical body preform 38, and an exhaust system (not shown) for removing reactant gases and uncollected soot particles. The vapor delivery system supplies chemicals and gases to the burners of the deposition assembly, and the control system controls vapor delivery as well as all functions of the deposition assembly. The invention relates to the configuration of the deposition assembly, so the description below is limited to that structure. Those skilled in the art will be familiar with the required vapor delivery and control systems suitable for use with the deposition assembly of the invention.

As shown in FIG. 2, the deposition assembly 32 includes a first burner array 42 configured for use during the first half of the deposition, when the preform 38 has a relatively small diameter, and it further includes a second burner array 44 configured for use during the second half of the deposition, when the preform has a relatively large diameter. The two burner arrays are located on opposite sides of the preform's longitudinal rotation axis 46.

The first burner array 42 includes twelve small burners 48, spaced evenly along the length of the array, and the second burner array 44 includes six large burners 50, likewise spaced evenly along the length of the array. The burners in both arrays are mounted on air actuators 52 configured to selectively position the burners in a deposition position, in alignment with the preforms's longitudinal axis 46, or in an idle position, horizontally withdrawn from that axis. In FIG. 2, the deposition positions of the two burner arrays are depicted in dotted lines, and the idle positions are depicted in solid lines. In the first burner array 42, each air actuator selectively positions two burners at a time, whereas in the second burner array 44, each air actuator selectively positions just one burner at a time. The withdrawal of the burners to their idle position avoids depositing glass outside a pre-selected length of useful target rod 34, and it conserves material by stopping the flow of chemicals and minimizing gas flows. In the apparatus shown in FIG. 2, the burners of both arrays are axially aligned with the airflow when the mounts are positioned in the deposition position.

FIGS. 3*a* and 3*b* are schematic views of portions of a burner array of the prior art, and FIGS. 4*a* and 4*b* are similar views of the burner arrays of a second embodiment of the invention. In particular, FIGS. 3*a* and 3*b* are elevational and plan views, respectively, of a prior art burner array 54 having three burners 56 spaced uniformly apart from each other by a distance d1, along a vertical axis. The three burners are selectively movable between an idle position, in which the burners are positioned horizontally off-axis from a vertically oriented target rod 58, and a deposition position, in which the burners are positioned so as to impinge normally on the target rod. In FIG. 3*b*, the idle position is depicted in solid lines and the deposition position is depicted in dotted lines. The burners are positioned in the idle position during ignition and stabilization of the flames. After the flames have stabilized, the burners are moved to the deposition position, where the burners are coaxial with the direction of the exhaust stream through an exhaust port 60.

In contrast, as shown in FIGS. 4*a* and 4*b*, this second embodiment of the invention includes two burner arrays, including a first burner array 62 having a number of relatively small burners 64, spaced close together and separated from each other by a distance d2, and further including a second burner array 66 having a lesser number of relatively large burners 68, spaced further apart from each other. The two burner arrays both are selectively movable between an idle position, in which the burners are positioned horizontally off-axis from a vertically oriented target rod 70, and a deposition position, in which the burners are positioned so as to impinge on the target rod. In FIG. 4*b*, the idle positions of the two burner arrays are depicted in solid lines and the deposition positions are depicted in dotted lines. The idle positions of the two burner arrays are located on opposite sides of the target rod, as shown in FIG. 4*b*.

Figure 5:
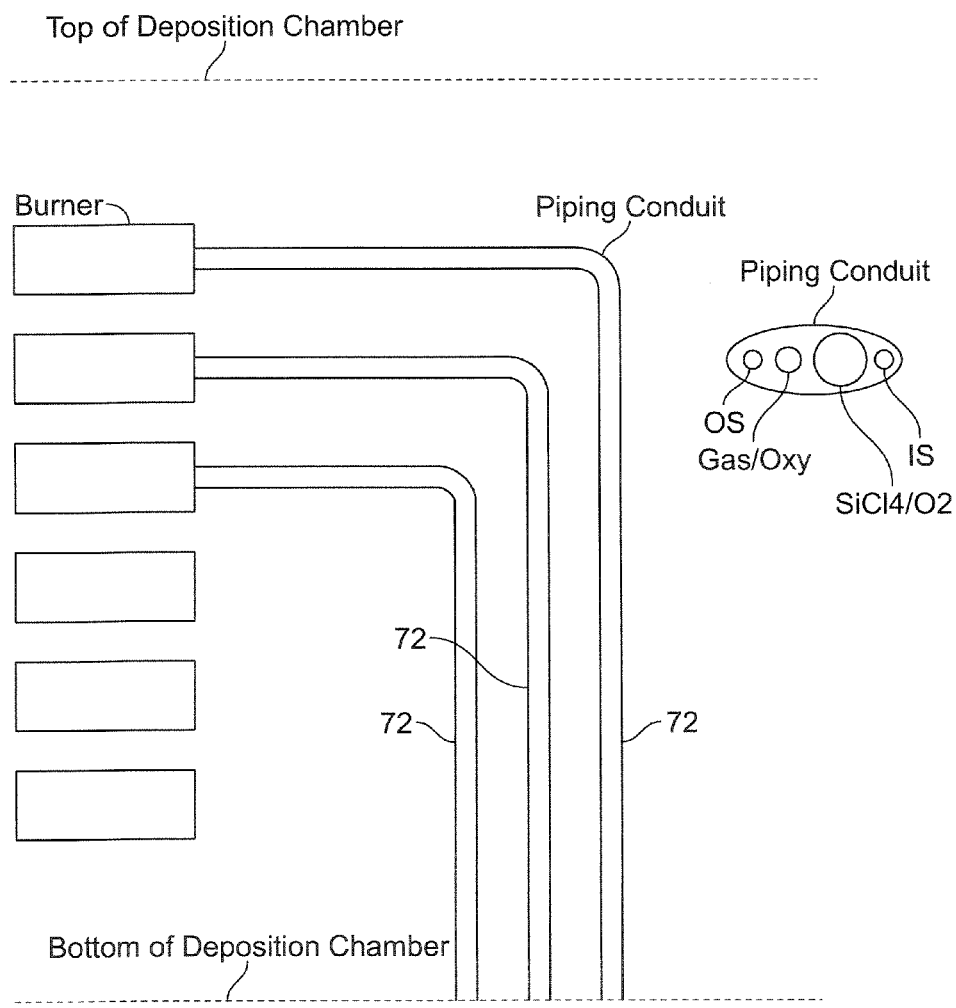
FIG. 5 is a simplified cross-sectional view of a piping conduit to one of the individual burners of the deposition assembly of FIG. 2 or FIGS. 4a and 4b.

The first burner array 62 is used during the early stages of deposition, when the cylindrical body (not shown) being formed on the target rod 70 has a relatively small diameter. The first burner array is initially positioned in its idle position and various conventional gases are supplied to the array through a conduit 72 (FIG. 5), for ignition and stabilization. After the flames have stabilized, the first burner array 62 is moved horizontally into general alignment with the target rod. It will be noted in FIG. 4*b* that the successive burners 64 of the first burner array impinge normally on the target rod, but they are azimuthally offset with respect to the air-flow direction. Because of this orientation, a dead zone of the soot stream that is created on the opposite side of the target rod is similarly azimuthally offset and located in a region where the air-flow velocity is non-zero.

The second burner array 66 is used during the later stages of deposition, when the cylindrical body has a relatively large diameter. The burners 68 of the second burner array are ignited when the array is positioned in its idle position, horizontally off-axis from the target rod 70. After the flames have stabilized, the array is moved to the deposition position, in alignment with the target rod. As shown in FIG. 4*b*, the successive burners of the second burner array impinge normally on the target rod, but they are azimuthally offset with respect to the air-flow direction, for the same purpose as described above with respect to the first burner array 62.

The burner assembly depicted in FIGS. 4*a* and 4*b* functions to efficiently exhaust substantially all of the uncollected soot. Deposition above the hot-zone on the target rod 70 and cylindrical body is avoided. In addition, because of the azimuthal offset in opposite directions of adjacent burners of both burner arrays 62 and 66, interaction of the flames of adjacent burners is minimized. This allows closer spacing of burners. Further, the use of two separate burner arrays, with the burners of one array being optimized for deposition onto a smaller diameter cylindrical body and the burners of the other array being optimized for deposition onto a larger diameter cylindrical body, greatly enhances the apparatus' deposition rate and material utilization.

It should be appreciated from the foregoing description that the present invention provides an improved outside chemical vapor deposition apparatus for depositing porous glass-forming material onto a target rod to form a cylindrical body, with substantially higher efficiency than could prior apparatus. The apparatus includes two separate burner arrays, one array optimized for depositing the material during an initial stage of the process, when the cylindrical body has a relatively small diameter, and the other array optimized for depositing the material during a later stage of the process, when the cylindrical body has a relatively large diameter. In addition, each burner array can include a plurality of burners, with each burner azimuthally angled relative to the apparatus' air-flow axis, and with adjacent burners angled in opposite directions relative to that axis, to minimize the density gradient within the deposited porous material.

Although the invention has been described with reference only to the presently preferred embodiments, those skilled in the art will appreciate that various modifications can be made without departing from the invention. Accordingly, the invention is not to be limited except by the following claims.

We claim:

1. An outside chemical vapor deposition apparatus for depositing porous glass-forming material onto a target rod to form a cylindrical body, comprising:

a first burner array constructed and arranged to direct glass-forming material substantially only radially toward the target rod to form a cylindrical body, wherein the first burner array further is constructed and arranged for optimum deposition when the cylindrical body has a first diameter, and wherein the first burner array further is constructed and arranged to be selectively movable between a deposition position, in which the burner array is substantially radially aligned with the cylindrical body, and an idle position, in which the burner array is not aligned with the cylindrical body; and a second burner array constructed and arranged to direct glass-forming material substantially only radially toward the cylindrical body, wherein the second burner array is constructed and arranged for optimum deposition when the cylindrical body has a second diameter, larger than the first diameter, and wherein the second burner array further is constructed and arranged to be selectively movable between a deposition position, in which the burner array is substantially radially aligned with the cylindrical body, and an idle position, in which the burner array is not aligned with the cylindrical body;

wherein the first and second burner arrays are constructed and arranged to deposit porous glass-forming material onto the cylindrical body separately and at successive times.

2. An apparatus in accordance with claim 1, wherein:
the first burner array includes a first plurality of burners that are spaced apart from each other along an axis parallel with the target rod's longitudinal axis;
the second burner array includes a second plurality of burners that are spaced apart from each other along an axis parallel with the target rod's longitudinal axis, the second plurality being less than the first plurality; and
the burners of the first burner array are spaced apart from each other by less than are the burners of the second burner array.

3. An apparatus in accordance with claim 2, wherein the first and second burner arrays have substantially the same lengths along axes parallel with the target rod's longitudinal axis and are arranged in a parallel relationship.

4. An apparatus in accordance with claim 1, wherein:
the first burner array includes a first plurality of burners extending along an axis parallel with the target rod's longitudinal axis, such burners being separated from each other by a first axial spacing;
the second burner array includes a second plurality of burners extending along an axis parallel with the target rod's longitudinal axis, such burners being separated from each other by a second axial spacing, greater than the first axial spacing; and
the apparatus further comprises a support for supporting and rotating the target rod and cylindrical body about the rod's longitudinal axis and for traversing the target rod and cylindrical body past the burners of first and second burner arrays.

5. An apparatus in accordance with claim 4, wherein:
the support supports the target rod and cylindrical body with the target rod's longitudinal axis in a substantially vertical orientation;
the first burner array is constructed and arranged to oscillate axially by an amount substantially the same as the first axial spacing between the array's first plurality of burners, while the support traverses the cylindrical body past the first burner array; and
the second burner array is constructed and arranged to oscillate axially by an amount substantially the same as the second axial spacing between the array's second plurality of burners, while the support traverses the cylindrical body past the second burner array.

6. An apparatus in accordance with claim 4, wherein the first and second burner arrays each are constructed and arranged to be selectively movable radially toward and away from the target rod's longitudinal axis, when such array is in its deposition position.

7. An apparatus in accordance with claim 1, wherein:
the apparatus further includes a support for supporting and rotating the target rod and cylindrical body about the rod's longitudinal axis, with the rod's longitudinal axis in a substantially vertical orientation;
the first burner array includes a first plurality of burners, and the second burner array includes a second plurality of burners; and
the first and second burner arrays are constructed and arranged to traverse past the target rod and cylindrical body while the support rotates the target rod and cylindrical body.

8. An apparatus in accordance with claim 7, wherein the first and second burner arrays each are constructed and arranged to be selectively movable radially toward and away from the target rod's longitudinal axis, when such array is in its deposition position.

9. An apparatus in accordance with claim 1, wherein:
the apparatus further comprises a support for supporting and rotating the target rod and cylindrical body about the rod's longitudinal axis; and
the first and second burner arrays are constructed and arranged to oscillate axially along only a fraction of the target rod's length.

10. An apparatus in accordance with claim 9, wherein:
the support supports the target rod and cylindrical body with the rod's longitudinal axis in a substantially vertical orientation; and
the first burner array includes a first plurality of burners, and the second burner array includes a second plurality of burners.

11. An apparatus in accordance with claim 9, wherein:
the support supports the target rod and cylindrical body with the rod's longitudinal axis in a substantially vertical orientation;
the first burner array includes a first plurality of burners, separated from each other by a first axial spacing, and the first burner array is constructed and arranged to oscillate axially by an amount substantially the same as the first axial spacing; and
the second burner array includes a second plurality of burners, separated from each other by a second axial spacing, and the second burner array is constructed and arranged to oscillate axially by an amount substantially the same as the second axial spacing.

12. An apparatus in accordance with claim 1, wherein:
the apparatus further comprises a support for supporting and rotating the target rod and cylindrical body about the rod's longitudinal axis, with such axis in a substantially vertical orientation;
the first burner array is constructed and arranged to move horizontally between its deposition position and its idle position; and
the second burner array is constructed and arranged to move horizontally between its deposition position and its idle position.

13. An apparatus in accordance with claim 1, wherein the deposition positions of the first and second burner arrays are substantially coincident with each other.

14. An outside chemical vapor deposition apparatus for depositing porous glass-forming material onto a vertically oriented, cylindrical target rod, to form a cylindrical body, comprising:
a first burner array constructed and arranged to direct glass-forming material radially toward the cylindrical wall of the target rod, to form a cylindrical body, wherein the first burner array includes a first plurality of burners spaced apart from each other along an axis parallel with the target rod's longitudinal axis, wherein the first burner array further is constructed and arranged for optimum deposition when the cylindrical body has a first diameter, and wherein the first burner array further is constructed and arranged to be selectively movable horizontally between a deposition position, in which the first burner array is substantially radially aligned with the cylindrical body, and an idle position, in which the first burner array is not aligned with the cylindrical body; and
a second burner array constructed and arranged to direct glass-forming material radially toward the cylindrical wall of the cylindrical body, to increase the diameter of the cylindrical body, wherein the second burner array includes a second plurality of burners spaced apart from each other along an axis parallel with the target rod's longitudinal axis, wherein the second burner array further is constructed and arranged for optimum deposition when the cylindrical body has a second diameter, larger than the first diameter, and wherein the second burner array further is constructed and arranged to be selectively movable horizontally between a deposition position, in which the second burner array is substantially radially aligned with the cylindrical body, and an idle position, in which the second burner array is not aligned with the cylindrical body;

wherein the deposition positions of the first and second burner arrays are substantially coincident with each other, and the first and second burner arrays are constructed and arranged to deposit porous glass-forming material onto the cylindrical body separately and at successive times.

15. An apparatus in accordance with claim 14, wherein:
the first plurality of burners of the first burner array are separated from each other by a first axial spacing;
the second plurality of burners of the second burner array are separated from each other by a second axial spacing, greater than the first axial spacing;
the first and second burner arrays have substantially the same lengths along axes parallel with the target rod's longitudinal axis; and
the apparatus further comprises a support for supporting and rotating the target rod and cylindrical body about the rod's longitudinal axis and for traversing the target rod and cylindrical body relative to the burners of first and second burner arrays.

16. An apparatus in accordance with claim 15, wherein:
the first burner array is constructed and arranged to oscillate axially by an amount substantially the same as the first axial spacing between the array's first plurality of burners, while the support traverses the cylindrical body past the first burner array; and
the second burner array is constructed and arranged to oscillate axially by an amount substantially the same as the second axial spacing between the array's second plurality of burners, while the support traverses the cylindrical body past the second burner array.

17. An apparatus in accordance with claim 15, wherein the first and second burner arrays each are constructed and arranged to be selectively movable radially toward and away from the target rod's longitudinal axis, when such array is in its deposition position.

18. An apparatus in accordance with claim 15, wherein the burners of the first and second burner arrays are inclined upwards relative to a horizontal axis.

19. An apparatus in accordance with claim 14, wherein the first and second burner arrays each are constructed and arranged to direct glass-forming material substantially only radially toward the target rod, when such array is in its deposition position.

20. An outside chemical vapor deposition apparatus for depositing porous glass-forming material onto a vertically oriented, cylindrical target rod, to form a cylindrical body, comprising:
a target rod support for supporting the target rod in a vertical orientation and for rotating the target rod about its longitudinal axis;

a first burner array constructed and arranged to direct glass-forming material substantially only radially toward the cylindrical wall of the target rod, to form a cylindrical body, wherein the first burner array includes a first plurality of burners spaced apart from each other by a first axial spacing along an axis parallel with the target rod's longitudinal axis, wherein the first burner array further is constructed and arranged for optimum deposition when the cylindrical body has a first diameter, and wherein the first burner array further is constructed and arranged to be selectively movable horizontally between a deposition position, in which the first burner array is substantially radially aligned with the cylindrical body, and an idle position, in which the first burner array is not aligned with the cylindrical body;

a second burner array constructed and arranged to direct glass-forming material substantially only radially toward the cylindrical wall of the cylindrical body, to increase the diameter of the cylindrical body, wherein the second burner array includes a second plurality of burners spaced apart from each other by a second axial spacing, greater than the first axial spacing, along an axis parallel with the target rod's longitudinal axis, wherein the second burner array further is constructed and arranged for optimum deposition when the cylindrical body has a second diameter, larger than the first diameter, and wherein the second burner array further is constructed and arranged to be selectively movable horizontally between a deposition position, in which the second burner array is substantially radially aligned with the cylindrical body, and an idle position, in which the second burner array is not aligned with the cylindrical body;

a first burner array support constructed and arranged to oscillate the first burner array axially relative to the support rod by an amount substantially the same as the first axial spacing between the array's first plurality of burners, while the target rod support rotates the target about its longitudinal axis, wherein the first burner array support further is constructed and arranged to selectively move the first burner array radially toward and away from the target rod's longitudinal axis, when the array is in its deposition position; and a second burner array support constructed and arranged to oscillate the second burner array axially relative to the support rod by an amount substantially the same as the second axial spacing between the array's second plurality of burners, while the target rod support rotates the target about its longitudinal axis, wherein the second burner array support further is constructed and arranged to selectively move the second burner array radially toward and away from the target rod's longitudinal axis, when the array is in its deposition position;

wherein the deposition positions of the first and second burner arrays are substantially coincident with each other, and the first and second burner arrays are constructed and arranged to deposit porous glass-forming material onto the cylindrical body separately and at successive times.

* * * * *

UNITED STATES PATENT AND TRADEMARK OFFICE
CERTIFICATE OF CORRECTION

PATENT NO. : 7,383,704 B2  
APPLICATION NO. : 11/050461  
DATED : June 10, 2008  
INVENTOR(S) : Arnab Sarkar et al.

Page 1 of 1

It is certified that error appears in the above-identified patent and that said Letters Patent is hereby corrected as shown below:

On the cover page item 73, assignee "Nextrom Oy (CH)" should read -- Nextrom OY (FI) --.

At column 4, line 65, "preforms's" should be -- preform's --.

Signed and Sealed this

Twenty-third Day of June, 2009

JOHN DOLL  
*Acting Director of the United States Patent and Trademark Office*